US011429755B2

(12) United States Patent
Westphall et al.

(10) Patent No.: US 11,429,755 B2
(45) Date of Patent: Aug. 30, 2022

(54) INTRUSION SWITCH

(71) Applicant: Hewlett Packard Enterprise Development LP, Houston, TX (US)

(72) Inventors: Paul E. Westphall, Tomball, TX (US); Keith Sauer, Spring, TX (US); David M. Paquin, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 606 days.

(21) Appl. No.: 16/399,293

(22) Filed: Apr. 30, 2019

(65) Prior Publication Data

US 2020/0349297 A1 Nov. 5, 2020

(51) Int. Cl.
*G06F 21/86* (2013.01)
*G06F 1/18* (2006.01)

(52) U.S. Cl.
CPC .............. *G06F 21/86* (2013.01); *G06F 1/182* (2013.01)

(58) Field of Classification Search
None
See application file for complete search history.

(56) References Cited

U.S. PATENT DOCUMENTS

| | | | |
|---|---|---|---|
| 5,896,273 A | 4/1999 | Varghese et al. | |
| 5,912,621 A | 6/1999 | Schmidt | |
| 5,945,915 A * | 8/1999 | Cromer | G06F 21/86 |
| | | | 340/686.1 |
| 6,014,747 A * | 1/2000 | Fackenthall | G06F 1/181 |
| | | | 340/568.3 |
| 6,191,503 B1 * | 2/2001 | Kitten | G06F 21/82 |
| | | | 307/112 |
| 6,289,456 B1 * | 9/2001 | Kuo | G06F 21/51 |
| | | | 726/34 |
| 7,323,986 B2 | 1/2008 | Hunter et al. | |
| 9,460,605 B2 | 10/2016 | Kohler et al. | |

(Continued)

FOREIGN PATENT DOCUMENTS

JP 201171719 A 6/2001

OTHER PUBLICATIONS

Dell EMC, "Poweredge T20 : Intrusion Switch," Youtube.com, Oct. 14, 2013, https://www.youtube.com/watch?v=2XWcQ2taf8s.

*Primary Examiner* — Christopher C Harris
(74) *Attorney, Agent, or Firm* — Hewlett Packard Enterprise Patent Department

(57) ABSTRACT

Examples herein relate to intrusion switch. In particular, implementations herein relate to a computer system including a housing enclosing at least one electronic component therein. The housing includes a base and a removable cover. The cover is movable between engaged and disengaged positions relative to the base and extends over at least a portion of the base and is secured to the base in the engaged position. The cover is removable from the base when the cover is in the disengaged position. The computer system further includes an intrusion switch configured to detect access to an interior of the computer system. A portion of the cover extends through a slot in one of the sidewalls of the base and contacts the intrusion switch when the cover is in the engaged position. Contact between the cover and the intrusion switch is released when the cover is in the disengaged position such that the intrusion switch can detect when the cover is moved to the disengaged position.

19 Claims, 4 Drawing Sheets

(56) References Cited

U.S. PATENT DOCUMENTS

| | | | |
|---|---|---|---|
| 2013/0249691 A1* | 9/2013 | Bertoni | G08B 13/02 340/541 |
| 2014/0184415 A1* | 7/2014 | Edmonds | G07F 7/0873 340/686.1 |
| 2014/0268559 A1* | 9/2014 | Vega | G06F 21/86 361/679.57 |
| 2019/0251299 A1* | 8/2019 | Kannler | G06F 1/181 |

* cited by examiner

INTRUSION SWITCH

BACKGROUND

As computers and computer data centers are more prevalent than ever before, improved security measures are becoming more desirable to detect and prevent unauthorized access or theft to such computers or computer data centers. Such security measures can include intrusion switches configured to detect intrusion or otherwise unauthorized access into an interior of a computer and provide an indication or alert of such intrusion. As valuable or sensitive data stored within a computer is not only susceptible to being stolen but also manipulated or modified, it is important for owners or users to be aware if the computer has been accessed without authorization.

BRIEF DESCRIPTION OF THE DRAWINGS

Certain examples are described in the following detailed description and in reference to the drawings, in which.

DETAILED DESCRIPTION OF SPECIFIC EXAMPLES

The present disclosure describes examples of a computer system having an improved intrusion switch as described in more detail below. As described herein, intrusion switches can detect intrusion or otherwise unauthorized access into an interior of a computer system and provide an indication or alert of such intrusion. The improved intrusion switch can be virtually or essentially tamper-proof. "Tamper-proof" as used herein refers to an intrusion switch that cannot be accessed (e.g., tampered with from outside a housing of the computer system) by an unauthorized user without an owner or user being able to detect or being alerted to such access. For example, access to the intrusion switch requires moving a cover to a disengaged position prior to removing the cover. Accordingly, in response to such movement, the intrusion switch detects the access or attempted access. Further, while unauthorized users may attempt deactivating the intrusion switch without moving the cover to the disengaged position such efforts may require drilling physical holes or pathways through the housing or cover leaving physical evidence that the owner or user can detect.

Figure 1A:
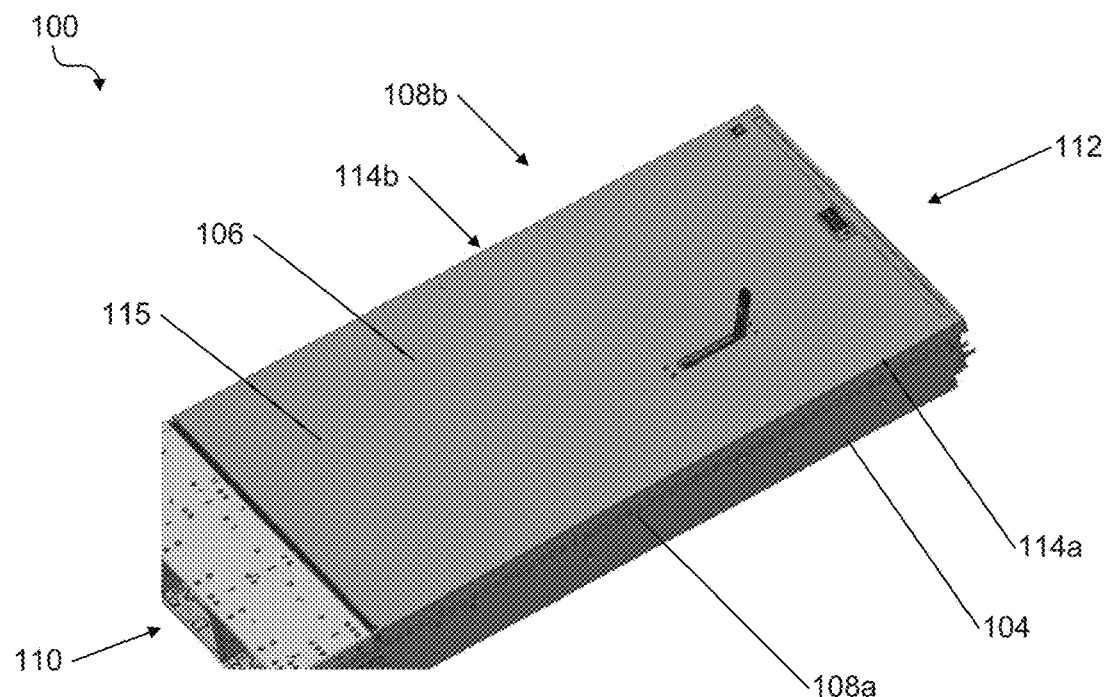
FIG. 1A illustrates an assembled view of an example of a computer system with a housing and intrusion switch according to the present disclosure.
Figure 1B:
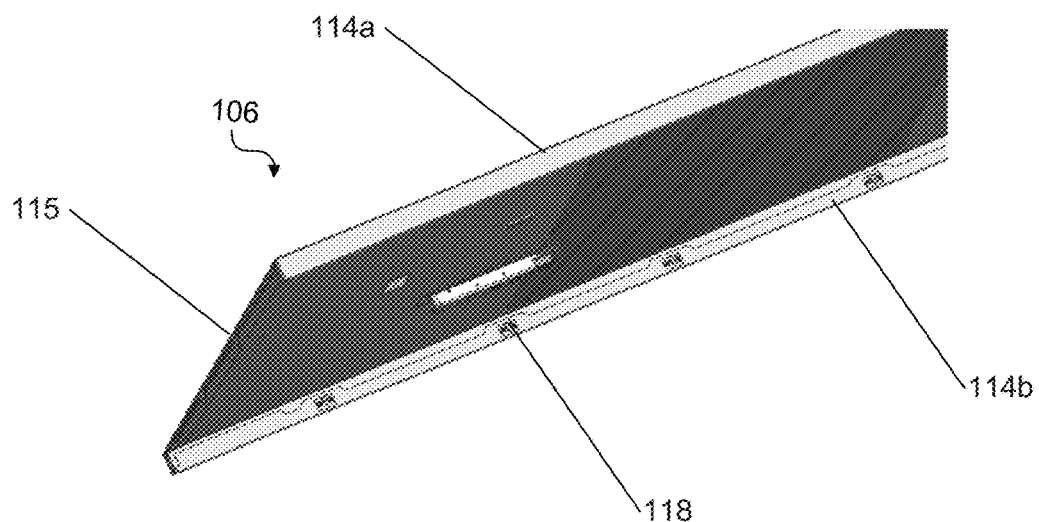
FIG. 1B illustrates a bottom perspective view of a portion of a cover of the housing of computer system of FIG. 1A.

FIGS. 1A-1D illustrate an example of a computer system 100 with an intrusion switch and other components thereof according to the present disclosure. Examples of computer system 100 include, but are not limited to, personal computers and server computers (e.g., blade servers). With reference to FIGS. 1A-1B, the computer system 100 includes a housing 102 (e.g., an enclosure). The housing 102 includes a base 104 and a removable cover 106. The base 104 can be a computer or server chassis. The housing 102 can enclose at least one electronic component therein (e.g., a motherboard, processor, memory, hard drive) when the cover 106 is engaged to the base 104.

The cover 106 is movable (e.g., slidable) between engaged and disengaged positions (see FIGS. 2A-2B) relative to the base 104. The cover 106 extends over at least a portion of the base 104 and can be secured (e.g., via interlocking engagement members, a snap-fit, or other locking mechanisms) to the base 104 when the cover 106 is in the engaged position. The cover 106 can be removed from the base 104 when the cover 106 is in the disengaged position. For example, when the cover 106 is in the disengaged position, the cover 106 can be lifted (e.g., upward) away from the base 104. The base 104 includes opposing sidewalls 108 (identified individually as 108a and 108b) extending from front to rear ends 110 and 112 of the base 104. The cover 106 can include opposing sidewalls 114 (identified individually as sidewalls 114a and 114b) coupled by a planar top surface 115 extending therebetween. The opposing sidewalls 114 of cover 106 can overlap or fit over the corresponding sidewalls 108 of the base 104 when the cover 106 is installed thereto.

Figure 1C:
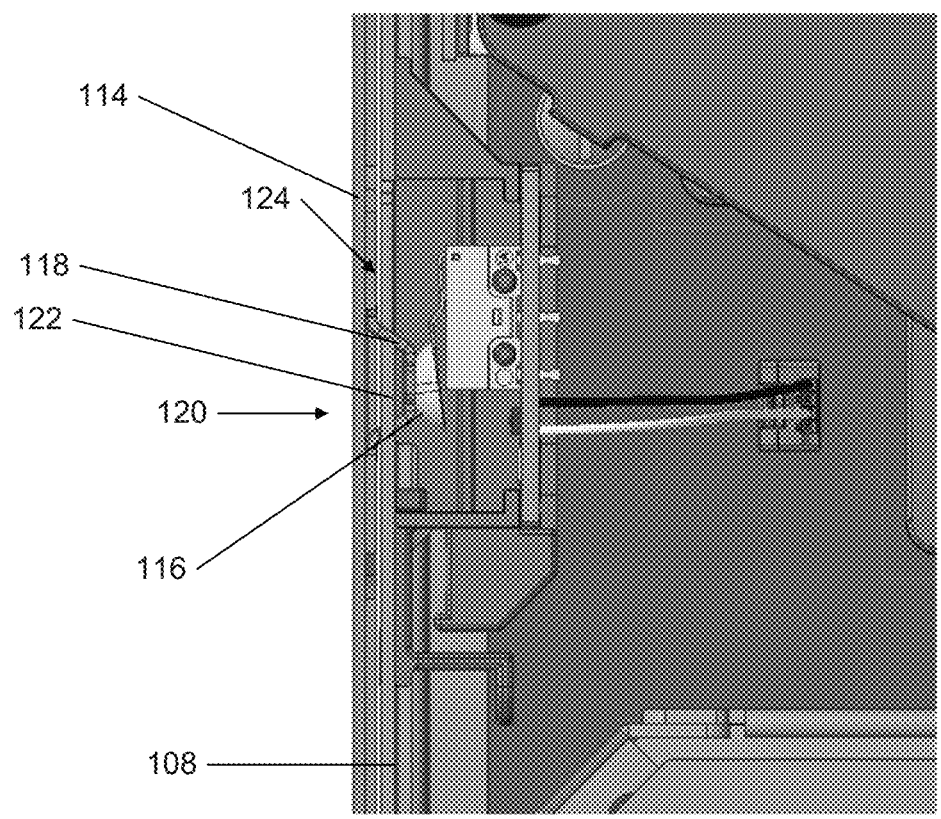
FIG. 1C illustrates a top section view of a portion of the computer system of FIG. 1A.
Figure 1D:
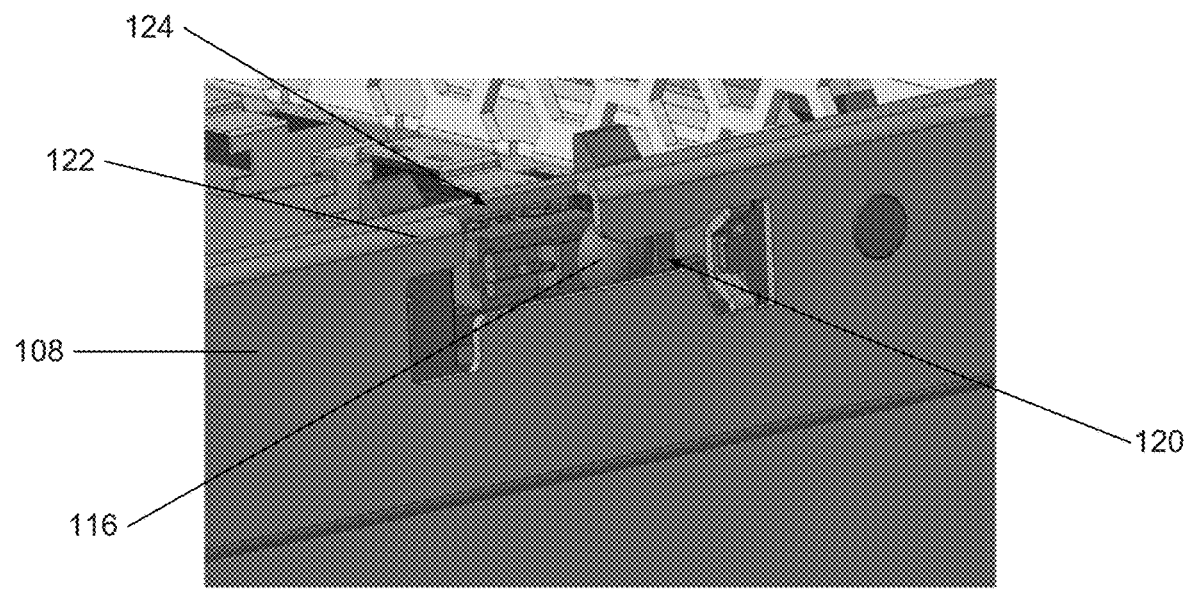
FIGS. 1D and 1E illustrate lateral and medial side views, respectively, of portions of a base of the housing of the computer system of FIG. 1A with a cover of the computer system removed.
Figure 1E:
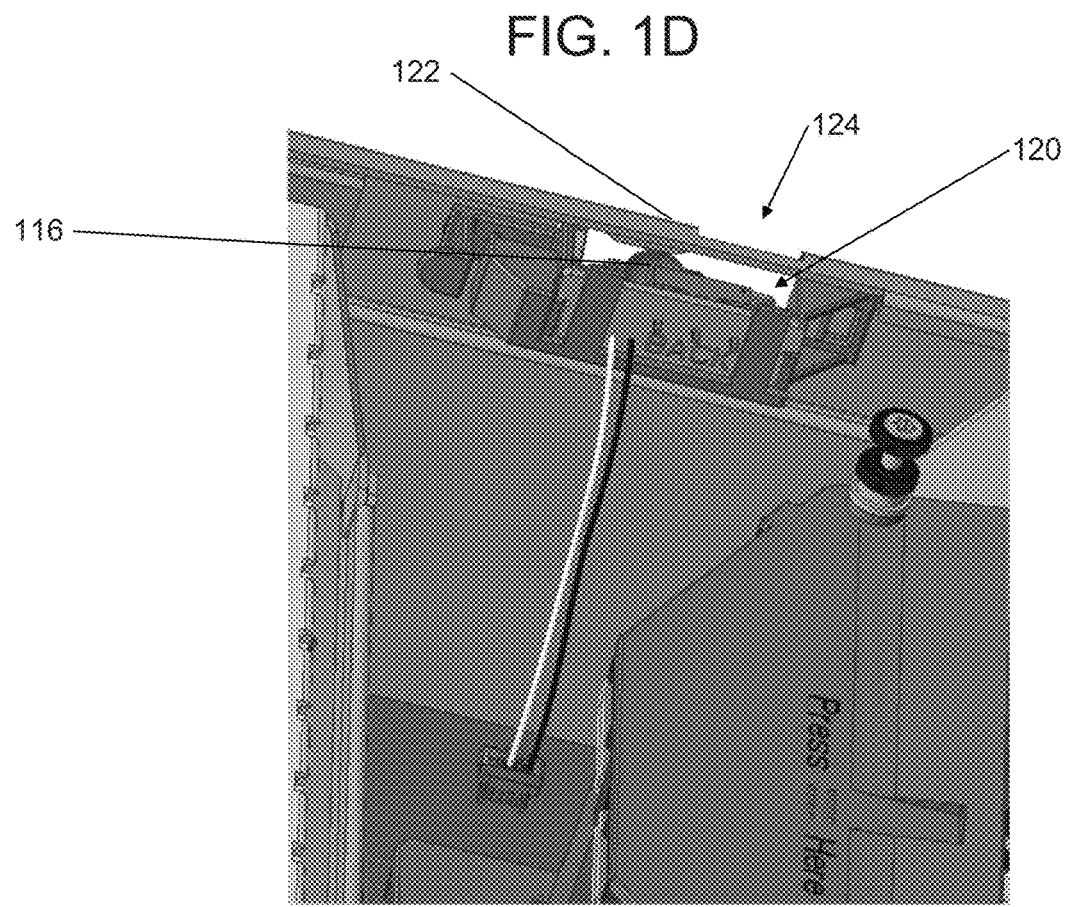

With reference to FIGS. 1C and 1D-1E together, the computer system 100 includes an intrusion switch 116. The intrusion switch 116 is configured to detect access to an interior of the computer system 100 when activated. The intrusion switch 116 is disposed within an interior of the base 104. For example, the intrusion switch 116 can be coupled to an interior side of a sidewall 108 of the base 104 (FIGS. 1D-1E). The base 104 further includes a slot 120 such that the intrusion switch 116 is configured to be accessible by the cover 106 as described in more detail below.

The cover 106 includes at least one engagement member 118 (e.g., a projection, protrusion, latch). The engagement member 118 extends through the slot 120 in one of the sidewalls 108 of the base 104 and contacts the intrusion switch 116 when the cover 106 is in the engaged position to activate the intrusion switch 116. For example, the engagement member 118 of the cover 106 extending through the slot 120 when the cover 106 is in the engaged position can be a protrusion extending medially towards an interior of the base 104.

When the cover 106 is in the engaged position with the engagement member 118 extending through the slot 120 to contact the intrusion switch 116, the intrusion switch 116 is tamper-proof or inaccessible from outside the housing 102. The configuration of the cover 106 and base 104 and components thereof enclose the intrusion switch 116 such that it cannot be tampered with (e.g., deactivated) without moving the cover 106 to the disengaged position which indicates tampering (e.g., intrusion or unauthorized access) or leaving physical evidence of tampering (e.g., drill holes, marks, deformations).

The base 104 can include a plurality of spaced apart slots 120 along the opposing sidewalls 108 each configured to receive a respective corresponding or mating engagement member 118 of the cover 106. The base 104 can include two or more intrusion switches 116 configured to be accessible through different slots 120 (e.g., on opposing sidewalls 108 or along the same sidewall 108) by respective engagement members 118 of the cover 106 when the cover is in the engaged position. Upper edges of the sidewalls 108 of the base 104 can further include an overhang or lip portion 122 (e.g., curved or L-shaped lip portion).

The lip portion 122 extends over an upper portion of the intrusion switch 116 (e.g., forming an upper portion or edge of the slot 120). The lip portion 122 provides a further barrier against unauthorized access (e.g., from above the housing 102) to the intrusion switch 116 when the cover 106 is in the engaged position as well as prevent the cover 106 from being removed when in the engaged position. A window or other opening 124 (e.g., cutout) can be formed through the lip portion 122 behind or to the rear of a portion of the intrusion switch 116 configured to be contacted by the engagement member 118. The opening 124 is sized to allow the engagement member 118 to pass therethrough such that the cover 106 can be removed from the base 104 when in the disengaged position as described in more detail below.

Figure 2A:
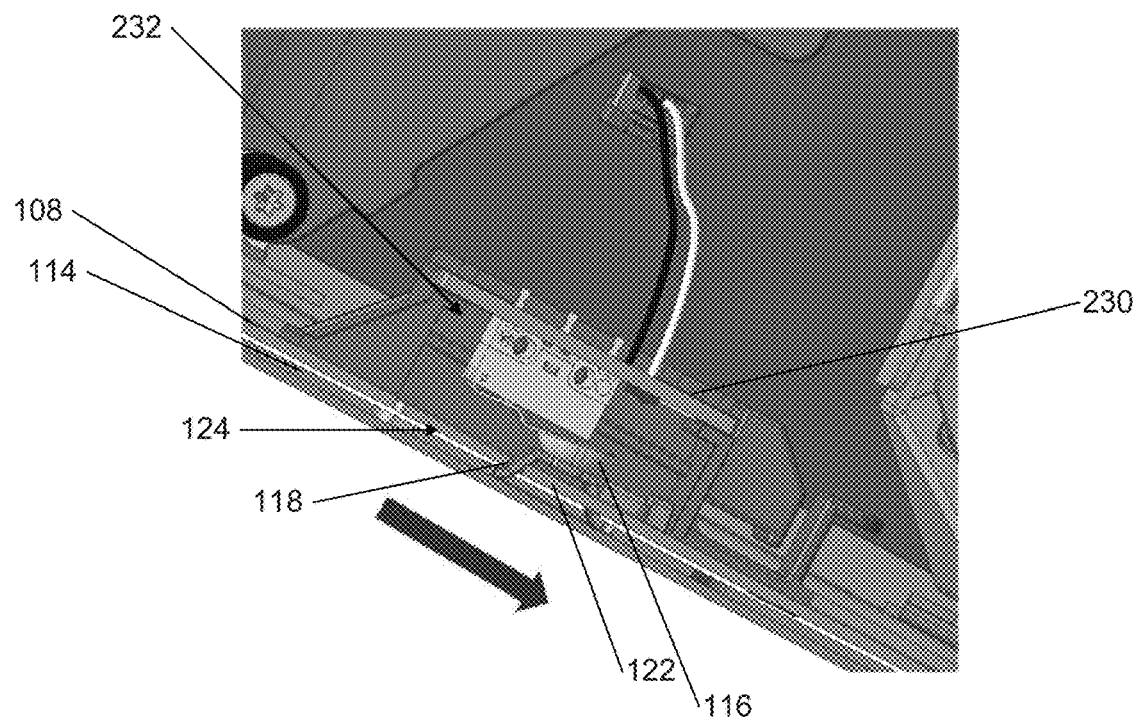
FIGS. 2A and 2B illustrate views of the computer system of FIG. 1A with a cover in engaged and disengaged positions, respectively, relative to a base of the computer system according to the present disclosure.
Figure 2B:
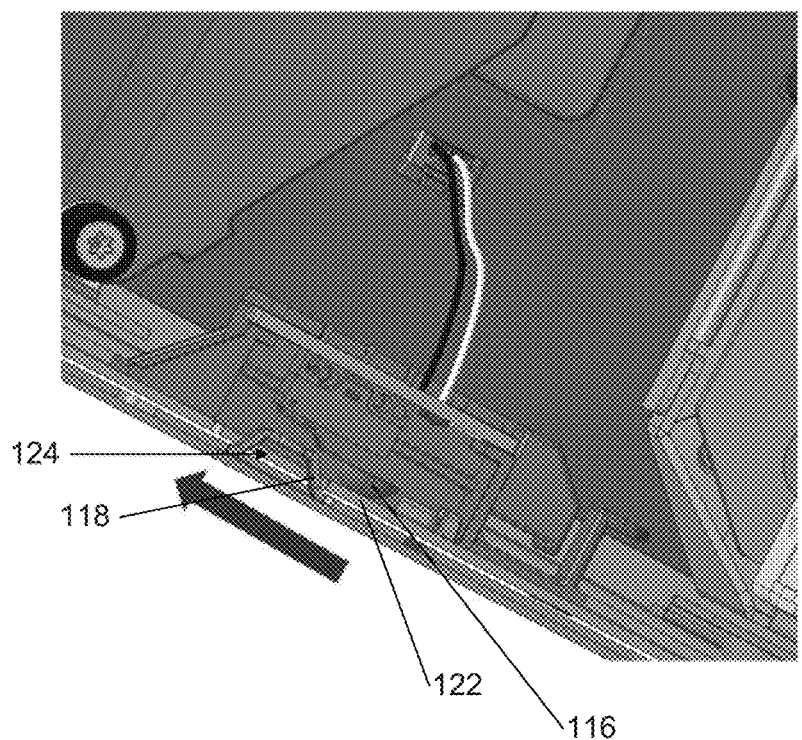

FIGS. 2A-2B illustrate the cover 106 in the engaged position and the disengaged position, respectively. The cover 106 can be positioned or mounted over the base 104 such that the engagement member 118 of the cover 106 is aligned with the opening 124 in the lip portion 122 of the base 104. The engagement member 118 can be moved into the slot 120 (e.g., through opening 124) as the cover 106 is lowered in position onto the base 104. The cover 106 can be slid or otherwise moved towards a front end 110 of the base 104 (e.g., in a direction parallel to a longitudinal axis of the housing 102 identified by the arrow) to be moved to the engaged position. In the engaged position, as discussed above, the engagement member 118 of the cover 106 contacts (e.g., presses or pushed on) the intrusion switch 116 (e.g., biasing the intrusion switch to a first position from an unbiased second position). The intrusion switch 116 can be coupled to or otherwise formed on a circuit board 230 as part of an intrusion detection circuit 232 as described in more detail below.

From the engaged position, the cover 106 can be slid or otherwise moved towards a rear end 112 of the base 104 to be moved to the disengaged position. Contact between the engagement member 118 of the cover 106 and the intrusion switch 116 is released (e.g., biasing force upon the intrusion switch 116 is released) when the cover 106 is moved to the disengaged position thus returning the intrusion switch 116 to the unbiased second position). When the cover 106 is moved from the engaged position to the disengaged position, the activated intrusion switch 116 detects access or intrusion (e.g., via opening or closing the intrusion detection circuit 232 as described in more detail below). The cover 106 is moved to the disengaged position from the engaged position without or prior to removing the cover 106 (e.g., the cover 106 remains coupled to the base 104 and enclosing the intrusion switch 116). The cover 106 can be removed (e.g., lifted upward away from the base 104) after the cover 106 is moved to the disengaged position from the engaged position (e.g., when the engagement member 118 is aligned with the opening 124).

As discussed above, the intrusion switch 116 can be coupled to the circuit board 230 and form the intrusion detection circuit 232. The intrusion detection circuit 232 can include a processor, power source (e.g., same as the computer system 100 and/or battery power). The intrusion detection circuit 232 can further be coupled to a display or alarm configured to provide a visual, haptic, or audio signal or alert to indicate to a user that the cover 106 has been moved from the engaged position to the disengaged position and that there has been access or an attempted access of the interior of the computer system 100.

In some examples, when the cover 106 is in the engaged position and the intrusion switch 116 is in the first position, the intrusion detection circuit 232 can be a closed circuit. When the cover 106 is moved to the disengaged position and the intrusion switch 116 is in the second position, the intrusion detection circuit 232 can be an open circuit. In response to opening the circuit from a closed circuit, the intrusion detection circuit 232 can detect access or an attempted access to the interior of the computer system 100. In other examples, the intrusion detection circuit 232 may be configured in an opposite manner. For example, the intrusion detection circuit 232 can be an open circuit when the intrusion switch 116 is in the first position and a closed circuit when the intrusion switch 116 is in the second position.

In response to the intrusion detection circuit 232 detecting such access (e.g., movement of the intrusion switch 116 from the first to the second position), the intrusion detection circuit 232 can indicate or alert a user (e.g., when the cover 106 is moved to the disengaged position from the engaged position such that contact between the cover 160 and the intrusion switch 116 is released). The intrusion detection circuit 232 can indicate or provide an alert prior to the cover 106 being removed from the base 104. For example, the intrusion detection circuit 232 can indicate to a user the cover 106 has been moved from the engaged position to the disengaged position when the computer system 100 is next powered on by activating or displaying an alert or message. Such an alert can include, but is not limited to, at least one of an audible signal, a visual signal, or a haptic signal. In some examples, after being triggered (e.g., via change from a closed circuit to an open circuit), the intrusion detection circuit 232 can transmit a signal or message to a remote monitoring system to indicate (e.g., to a user or network administrator) the cover 106 has been moved from the engaged position to the disengaged position.

In the foregoing description, numerous details are set forth to provide an understanding of the subject disclosed herein. However, implementations may be practiced without some or all of these details. Other implementations may include additions, modifications, or variations from the details discussed above. It is intended that the appended claims cover such modifications and variations. The specification and drawings are, accordingly, to be regarded as illustrative rather than restrictive.

It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list, and any combination of the items in the list. As used herein, the terms "connected," "coupled," or any variant thereof means any connection or coupling, either direct or indirect (e.g., having additional intervening components or elements), between two or more elements, nodes, or components; the coupling or connection between the elements can be physical, mechanical, logical, optical, electrical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. A computer system comprising:
a housing enclosing at least one electronic component therein, the housing including a base and a removable cover, the base having opposing sidewalls, the cover movable between engaged and disengaged positions relative to the base, the cover extending over at least a portion of the base and being secured to the base when the cover is in the engaged position, and the cover being removable from the base when the cover is in the disengaged position; and an intrusion switch configured to detect access to an interior of the computer system, the intrusion switch disposed within an interior of the base, wherein a portion of the cover extends through a slot in one of the sidewalls of the base and contacts the intrusion switch when the cover is in the engaged position and wherein contact between the portion of the cover and the intrusion switch is released when the cover is in the disengaged position such that the intrusion switch detects access to the interior of the computer system when the cover is moved from the engaged position to the disengaged position.

2. The computer system of claim 1, wherein the intrusion switch is coupled to one of the sidewalls of the base.

3. The computer system of claim 1, wherein the portion of the cover extending through the slot in contact with the instruction switch when the cover is in the engaged position is a protrusion extending medially towards interior of the base.

4. The computer system of claim 1, wherein the intrusion switch detects access to the interior of the computer system in response to the cover being moved from the engaged position to the disengaged position prior to the cover being removed.

5. The computer system of claim 1, wherein the at least one sidewall of the base including the slot includes a lip portion extending over an upper portion of the intrusion switch.

6. The computer system of claim 1, wherein the cover is slidable between the engaged and disengaged positions.

7. The computer system of claim 6, wherein the cover is slidable towards a front end of the base to be moved to the engaged position and towards a rear end of the base to be moved to the disengaged position from the engaged position.

8. The computer system of claim 1, wherein the intrusion switch indicates access to the interior of the computer system when contact between the protrusion of the cover and the intrusion switch is released.

9. The computer system of claim 1, wherein the cover is configured to be lifted upward away from the base to be removed after being moved to the disengaged position.

10. The computer system of claim 1, wherein the intrusion switch is disposed entirely within the base when the cover is in either engaged or disengaged positions.

11. A computer system comprising:

a housing including a base and a removable cover, the base having opposing sidewalls, the cover movable between engaged and disengaged positions relative to the base and being secured to the base in the engaged position; and an intrusion detection circuit configured to detect when the cover has been moved from the engaged position to the disengaged position, the intrusion detection circuit comprising an intrusion switch disposed within an interior of the base movable between first and second positions, wherein a portion of the cover extends through a slot of one of the sidewalls of the base and contacts the intrusion switch when the cover is in the engaged position to move the intrusion switch to the first position and wherein contact between the portion of the cover and the intrusion switch is released when the cover is in the disengaged position to move the intrusion switch to the second position, and wherein the intrusion detection circuit in response to the intrusion switch being moved from the first position to the second position detects the cover has been moved from the engaged position to the disengaged position prior to the cover being removable from the base.

12. The computer system of claim 11, wherein the intrusion switch is coupled to one of the sidewalls of the base.

13. The computer system of claim 11, wherein the cover is slidable between the engaged and disengaged positions.

14. The computer system of claim 11, wherein when the intrusion switch is in the first position the intrusion detection circuit is a closed circuit and when the intrusion switch is in the second position the intrusion detection circuit is an open circuit.

15. The computer system of claim 11, wherein when the intrusion switch is in the first position the intrusion detection circuit is an open circuit and when the intrusion switch is in the second position the intrusion detection circuit is a closed circuit.

16. The computer system of claim 11, wherein the intrusion detection circuit after detecting the cover has been moved from the engaged position to the disengaged position is configured to indicate to a user the cover has been moved from the engaged position to the disengaged position when the computer system is powered on.

17. The computer system of claim 11, wherein the intrusion detection circuit is configured to identify that the cover has been moved from the engaged position to the disengaged position by activating an alert.

18. The computer system of claim 17, wherein the alert comprises at least one of an audible signal, a visual signal, or a haptic signal.

19. The computer system of claim 11, wherein the intrusion detection circuit is configured to transmit a signal to a remote monitoring system to indicate the cover has been moved from the engaged position to the disengaged position.

* * * * *